United States Patent [19]
Orquera

[11] Patent Number: 5,932,279
[45] Date of Patent: Aug. 3, 1999

[54] MEAT PRESERVING COMPOSITION

[76] Inventor: Florentino Leopoldo Orquera, Ruta 19- Km. 127, (2438) Prov. Santa Fe, Argentina

[21] Appl. No.: 08/955,672

[22] Filed: Oct. 22, 1997

Related U.S. Application Data

[62] Division of application No. 08/645,235, May 13, 1996, Pat. No. 5,762,986.

[30] Foreign Application Priority Data

Oct. 25, 1995 [AR] Argentina ................................. 333993

[51] Int. Cl.⁶ .................................................. A23L 3/3517
[52] U.S. Cl. ........................................... 426/652; 426/652
[58] Field of Search ..................... 426/326, 332, 426/641, 646, 652, 654

[56] References Cited

U.S. PATENT DOCUMENTS

| | | | |
|---|---|---|---|
| 3,899,600 | 8/1975 | Sweet | 426/332 X |
| 4,191,783 | 3/1980 | Burkwall et al. | 426/646 X |
| 4,559,234 | 12/1985 | Rubin et al. | 426/641 X |

*Primary Examiner*—Arthur L. Corbin
*Attorney, Agent, or Firm*—Rodman & Rodman

[57] ABSTRACT

A composition for preserving a meat product obtained from slaughtered animals. The meat product is preserved by inhibiting the growth of undesired microorganisms, while the organoleptic features of the meat are retained. The preserving composition comprises a quantity of alkyl ($C_1$–$C_4$) esters of p-hydroxybenzoic acid in aqueous solution present in an amount effective to inhibit the growth of the undesired microorganisms. The aqueous solution also contains at least partially dextrinized flour as a film forming agent.

8 Claims, 1 Drawing Sheet

MEAT PRESERVING COMPOSITION

This is a division of application Ser. No. 08/645,235, filed May 13, 1996, now U.S. Pat. No. 5,762,986.

BACKGROUND OF THE INVENTION

1. Field of the Invention

The present invention relates to the field of conserving and preserving a food product from decay by the action of undesired microorganisms. More particularly, the invention relates to a method for preserving a meat product by inhibiting the growth of undesired microorganisms and includes a preserving compound for applying to a meat product.

For the purpose of the present description the term "inhibiting the growth of microorganisms" should be understood as being the capability of inhibiting, as well as delaying, totally or partially, the growth of microorganisms. The term "meat product" means any foodstuff containing meat, meat based products, meat combined with any other food product or just pure meat. The meat will be any edible meat obtained from slaughtering animals, such as beef, pork meat, lamb meat, etc.

2. Description of the Prior Art

Any kind of meat from slaughtered animals contains microorganisms, some microorganisms are present on the meat surface and within the meat tissue while other microorganisms grow during the slaughtering operations, such as viscera removing, airing, cutting, etc. Although most of the microorganisms are eliminated by washing the meat with water, many microorganism colonies remain in the tissues, particularly in folds, fissures and interfibrillar gaps of the muscle tissues, wherein microorganisms, under favorable biotic conditions, may increase by multiplication and spread into colonies to neighboring areas, thus extending the contamination all over and within the meat mass.

Several techniques are known to be developed, applied and tested in the field of conservation of meat, such as smoking, salting of meat pieces or special cuts, and sterilization by thermal treatment of meat. These techniques are widely used in the meat conserving and preserving industry.

By the above techniques, however, the taste and appearance of the meat products becomes markedly different from the authentic taste. The same occurs with the flavor and even the color of the meat, as compared with these properties in the fresh meat. Some other techniques have been tested in order to obtain meat products having features closer to the genuine flavor and taste of the fresh meat product. Among these methods UV radiation has been used to irradiate the meat. The live animal can also be treated with antibiotics before slaughter in order to avoid and inhibit contamination by of bacteria growth and moss.

The use of chemical solutions has also shown more successful results than the ones above mentioned. These chemical methods have involved the washing of meat with dilute trisodium phosphate ($Na_3PO_4$) in solution at 1% and curing of meat with solutions of sodium nitrite/nitrate. Recently, meat has been treated with aqueous solutions of alkaline metal orthophosphates, more precisely sodium orthophosphate ($Na_3PO_4$) aqueous solutions having a pH of 11.0–11.5, used as baths or solutions wherein any kind of meat (red meat and white meat) is immersed.

Although some of the above methods and techniques have shown relatively good results, in many cases the flavor, the taste, and the general organoleptic features of the meat are affected. The methods are not as effective as desired and they are expensive.

3. Summary of the Invention

It is therefore an object of the present invention to provide a new method for treating meat and meat products to inhibit the growth of microorganism colonies, particularly bacteria and microscopic moss, which are well known contaminants of meat from slaughtered animals. The method is based on treating the meat with aqueous solutions of alkyl esters of p-hydroxybenzoic acid, the meat being cut in pieces preferably having a thickness not exceeding 6–7 cm. The aqueous solutions of alkyl esters of p-hydroxybenzoic acid are comercially known as parabens, and indicated as fungicides (Index Merck—Ref: 6021 (1989), and food preservatives).

It is yet another object of the invention to provide a method for preserving a meat product obtained from slaughtered animals, the meat product being preserved by inhibiting the growth of undesired microorganisms, while the organoleptic features of the product are retained. The method comprises: contacting the meat product with an effective quantity of alkyl ($C_1$–$C_4$) esters of p-hydroxybenzoic acid in aqueous solution, the aqueous solution further containing flour as a film-forming agent, the flour being at least partially dextrinized.

It is another object of the invention to provide a method for preserving a meat product obtained from slaughtered animals, the meat product being preserved by inhibiting the growth of undesired microorganisms, while the organoleptic features of the product are retained. The method comprises contacting the meat product with an effective quantity of alkyl ($C_1$–$C_4$) esters of p-hydroxybenzoic acid in aqueous solution, the aqueous solution further containing flour as a film-forming agent, the flour being at least partially dextrinized, the aqueous solution comprising a wetting agent selected from 1,2-propylene glycol and 1,2-butylene glycol.

It is still another object of the invention to provide a preserving compound for a meat product obtained from slaughtered animals, the meat product being preserved by inhibiting the growth of undesired microorganisms, while the organoleptic features of the meat product are retained. The compound comprises: an effective quantity of alkyl ($C_1$–$C_4$) esters of p-hydroxybenzoic acid in aqueous solution, the aqueous solution further containing flour as a film-forming agent, the flour being at least partially dextrinized.

It is also another object of the invention to provide a compound for preserving a meat product obtained from slaughtered animals, the meat product being preserved by inhibiting the growth of undesired microorganisms, while the organoleptic features of the product are retained. The compound comprises an effective quantity of alkyl ($C_1$–$C_4$) esters of p-hydroxybenzoic acid in aqueous solution, the aqueous solution further containing flour as a film-forming agent, the flour being at least partially dextrinized, the aqueous solution further comprising a wetting agent selected from 1,2-propylene glycol and 1,2-butylene glycol.

The above and other objects, features and advantages of this invention will be better understood when taken in connection with the accompanying drawings and description.

DESCRIPTION OF THE PREFERRED EMBODIMENTS

Figure 1:
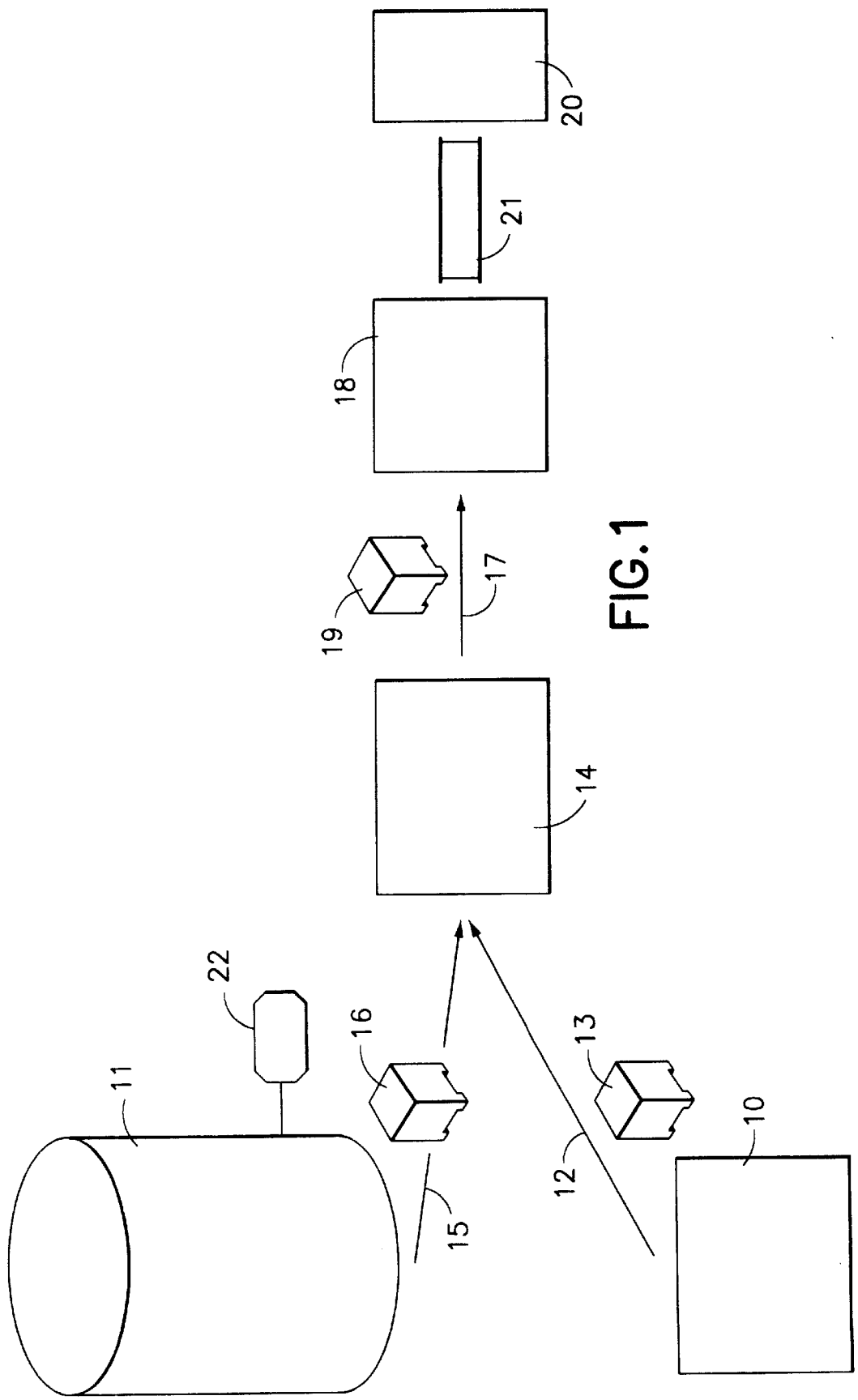
FIG. 1 is a diagramatic illustration of a layout for carrying out the method of the invention.

The esters, particularly the low alkyl esters, especially the alkyl ($C_1$–$C_3$) esters, generically named parabens, are well known for their microbiocidal properties, even when they are present with proteins, gums and emulsifiers. The solubility of parabens in water is low and, when dissolved in water, they form solutions having a pH between 4.6–5.0.

The microbiocidal properties of the parabens have been largely studied and tested and can same may be found in the literature. The intensive biocidal activity of parabens is well known regarding the bacteria commonly found in foodstufs, such as: *E. coli,* Pseudomona, Aeruginosa, *Salmonella enteritidis, Lactobacillus buchneri, Saccharomyces cerevisiae,* etc.

The biologic activity of the alkyl esters of p-hydroxybenzoic acid are, like benzoic acid and sorbic acid, preservatives with major fungicidal activity due to the OH phenolic group. Its antibacterial activity, however, is better than the cited acids, particularly against Grampositive bacteria. Since the effects of the esters alone differ one from the other, they are usually used in mixtures with a synergistic effect not entirely clear. In practice, therefore, the use of these compounds as preservative agents depends on the solubility, organoleptic properties and biocidal activity. Therefore, the moieties of different agents in a mixture are determined on the basis of the advantages of some agents and the advantages of the agents.

The concepts of the present invention are generally applied to meat and muscle tissues of any kind of animals, preferably breeding animals like sheep, cow, etc. as well as birds, fish in general, meat in pieces or minced meat. The process of the invention may also be applied to slaughtered meat before or after rigor mortis. When referring to pieces of meat, these pieces may be obtained from chopping methods and each piece should preferably have a thickness between 3.8 to 5.0 cm, while the minced meat comprises pieces much smaller than the pieces of the chopped meat.

In accordance with the method of the invention the meat may be cut or chopped into pieces or may be already available in pieces, the pieces being immersed in an aqueous treating solution comprising parabens, preferably methyl and propyl parabens, at temperatures no higher than 30–45° C., the quantity of parabens being 0.1–0.3 w % of the total weight of the meat being treated and the solution.

The solution can include optional additives such as sodium chloride in a concentration of 1% p/v, for example, and sodium nitrite in a concentration of about 50 ppm as a color-enhancing agent for red meats as well as preservative complementary agents having well known biocidal properties against persistent bacteria, such as Salmonella.

The immersing treatment is carried out for 1 to 2 hours, depending on the thickness and size of the meat pieces, and the solution with the pieces is constantly stirred. The final point of the process is analytically determined by controlling the paraben contents in the meat under treatment by solvent extraction (oil ether, for example) or vapor washing, saponification of extracts and spectrophotometric record of extracts at 255 mm.

At the end of the treatment the meat is separated and recovered from the solution bath. In the case of minced meat the meat is separated by screening, settling, decantation or centrifugation. In the case of larger sized pieces of meat the meat is separated from the solution mechanically or by drainage.

In further steps of the method of the invention the meat is exposed to air for ventilation whereby the drainage of the treating solution is completed and the meat product becomes dry. These operations are generally carried out in drying chambers under controlled relative humidity (RH) and temperature, by keeping the meat stationary or, for example, by moving the meat over foraminous conveying belts, such as a multiply punctured belt or a chain or wire-made belt for allowing air to flow through the belt. Once dry, the meat may be packaged under vacuum conditions in bags or packages, preferably into oxygen and vapor barrier materials. Plastic films having a thickness of 75 $\mu$m are preferred as wrapping materials, with these films having a permeability in the range of 32.5 ml/m$^2$/24 hrs. at a pressure of 1 atm. and 23° C., and 4.5 gr/m$^2$/24 hrs. at 100% relative humidity, respectively. The meat products treated according to the concepts of the invention and packaged under the above mentioned conditions show an excellent degree of conservation at room temperature.

In addition to the parabens as biocidal agent, the inventive compound also comprises further additives as complementary components for helping and reinforcing the effects provided by the parabens. The compound of the invention also may include film-forming agents capable of forming a film over the meat pieces under treatment for the purpose of retaining the paraben particles deposited on the treated meat surface. Suitable film forming components are dextrins which are formed during preparation of the treating solution as a result of hydrolysis of the cereal flours. A preferred cereal flour is wheat flour. Other film forming agents may include vegetal gums, gels, agar-agar, etc.

The parabens are provided in the solution in a range of 0.2 w % based in the total weight of the solution and the meat under treatment. The inventive compound conveniently comprises optional additives such as aliphatic 1,2-diols, for example 1,2-propylene glycol or 1,2-butylene glycol, in a range of 1 w % based on the total weight of meat plus water plus film forming agent. These additives are included for enhancing the parabens solubility in water, as well as the parabens wetting properties whereby the dispersing quality of the aqueous solution is increased and the solution is thus capable of entering into the most, if not all, interfibrillar gaps, cuts, etc., in the muscles and tissues of the meat product.

The inventive solution may also include sodium nitrite or potassium nitrite as a complementary biocidal agent, particularly for some bacteria which are resistant to parabens, especially the Salmonella species; evaporating in concentrates of 50 ppm. There are other optional additives which may be used with the invention, which additives are used for inhibiting the premature decay of the treated meat products. These additives are antioxidant substances such as hydroxybutyl toluene (BHT) or ascorbic acid, which preserve the fat in the meat from becoming rancid. With minced meat products, the addition, during the mincing operations, of organic acids, such as citric acid, or tartaric acid, for example, in an effective amount so as to keep the pH of the muscle proteins in the range of 5.3 has been demonstrated to be convenient.

Hereinafter, some illustrative examples will be provided to show some ways the invention may be carried out and the results of their applications.

EXAMPLE 1

Raw meat and cereal flour.

a) Visceras or muscles are cut in pieces having a thickness not exceeding 1–1.5". The cutting operation may be carried out manually and by means of a conventional machine.

b) Water has been heated the boiling point in a container having heating means and stirring means. A mixture of 0.2 w % combined esters based on the total weight of the meat, cereal flour and water, is added into the water. The contents of the container are vigorously stirred during 5 min. to obtain a desired dilution of the EC (combined esters of methyl and propyl p-hydroxybenzoic acid). 1 w % propylene glycol based on the total weight is added to increase the solubility and to decrease the water activity of the meat.

c) Cereal flour is added to the water containing the EC, the water being maintained at 100° C. during 30 min. under slow stirring, to cause flour dextrinization.

d) Then, coadjuvants are added: curing salt (1% sodium chloride and 50 ppm sodium nitrite—$NaNO_2$), the temperature is lowered to 40° C. and BHT (Butyl hydroxy toluene) is added as a fat antioxidant.

e) The pieces of meat (obtained in step a) are placed into a mixer, the pH of the muscle protein being modified up to the isoelectric point by means of an organic acid.

f) The water, the dextrinized flour and sugar at 0.5% is added to the meat, the mixture remains for 60 min. under low stirring, during which time the maximum microorganism inhibiting capacity of the EC are reached. Once the ECs are within the muscle fibers, the EC's microorganism inhibiting activity is powerfully maintained.

g) After mixing, the obtained mass is fed to a dosifying machine for later packaging of the product.

h) Packaging techniques:

h.1. In a light and oxygen permeable packaging the product has been conserved, suitable for consuming, during three months. A microbiologic analysis has been carried out at a temperature of 50° C. and a total of 59,000 UFC-G of mesophyll aerobic microorganisms has been determined. The organoleptic aspect of the product changed at 90 days under the effect of UV rays and Oxygen (fat oxidation).

h.2. In a three-layer, light, oxygen and vapor barrier package, with a film having a thickness of 75 micrometers, having a permeability higher than 37.5 $cc/m^2/24$ hrs., at 1 atm. and 23° C., and 4.5 $gr/m^2/24$ hrs. at 100% RH and 38° C., respectively, the product remained preserved, suitable for consuming, during eight months at a temperature not exceeding 50° C.

h.3. In a three-layer package like the one of item h.2., under vacuum conditions plus carbon dioxide and nitrogen (compensated atmosphere), the product remained suitable for consuming during twelve months at a temperature not exceeding 50° C.

In the FLO-EC process the meat with an average moisture degree and low water activity are highly resistant to microbial decay, but those products are not so resistant to chemical alterations such as fat rancidness, proteins and free aminoacid darkening with reducing sugar, thus altering the meat's natural taste. To avoid this phenomenum or delay these chemical effects, the product is maintained in an atmosphere free of oxygen, under vacuum conditions and in suitable packages.

EXAMPLE 2

Semi-cooked meat with cereal flour.

This example is mostly like Example 1 except that the water with the pieces of meat are first heated to the boiling point and boiling maintained during fifteen minutes, with the content of EC being 0.3 w % based on the total weight of the mixture.

EXAMPLE 3

Cooked meat.

This example is mostly like Example 1 except that the water with the pieces of meat are first heated to the boiling point and boiling maintained during thirty minutes, with the content of EC being 0.3 w % based on the total weight of the mixture.

As stated above, any cereal flour may be well used with the present invention, preferably the flour from wheat, corn, oats, etc. The purpose of the flour is to provide dextrins during the preparation of the preservative solution. The dextrins are generated in a sufficient amount so that an adhering film is formed over the meat surface during drainage and drying of the treated meat product, whereby the paraben-containing residual material is retained against the meat, while the film is entirely covering the meat surface once the water of the solution is drained and eliminated by evaporation.

This is way the preservative solution must be formed under a high temperature of 80° to 100° C., for example, for helping the paraben dilution and generating enough dextrinization of the flour. If desired, the flour may be at least partially substituted by natural grains: pectine, xanthane gum, gel, etc.

As it has also been stated above, the preserving solution of the invention may include optional additives, for example for providing particular organoleptic properties, especially when the meat products are for direct consumption. Thus the conservative solution may include salt, glutamic acid, etc.

The meat products treated according to the concepts of the invention may be used either for feeding animals or for human foodstuff, such as red meat, white meat, fish meat, and hunting-animal meat. The invention may be applied to any meat either before or after the cooking of the meat.

FIG. 1 shows is a diagramatic illustration of a layout for carrying out the method of the invention, wherein minced meat is being treated as an example, whereas any other meat product may be processed.

The meat is minced or chopped in pieces within a mincing or chopping machine 10, which may be of the conventional type in the meat manufacturing industry. Machine 10 may be manually or automatically fed as it is well known in the art. The fat and undesired tissues of the meat may also be conventionally removed and the meat may be washed before mincing. The meat product exiting from machine 10 is conveyed, as indicated by arrow 12, either by conveying belts or small wagons 13, into a mixer 14. The hot preserving solution of the invention is contained in a tank 11 including a stirring device 22. The solution is conducted through a line indicated by arrow 15, either by a dosifying tubing arrangement or conveying containers 16, into mixer 14.

Stirring device 22 keeps the mixture of paraben, wheat flour, water and additives under stirring at a temperature of 100° C. so as to promote at least partially, the hydrolysis of the flour whereby sufficient amounts of dextrins are generated to form a coherent and adhering film coverage over the meat pieces.

The treated meat exiting from the mixer 14 is conveyed, as indicated by arrow 17, by means of conveying screws or small wagons 19, into a dosifying and packaging machine 18 for pre-packaging the product. The pre-packaged meat product is provided from machine 18, via 21, to a vacuum packaging apparatus 20, wherein the meat product is packaged under vacuum conditions or, if desired, into a compensated and controlled atmosphere.

TEST 1

MICROBIOLOGICAL ANALYSIS OF TREATED RAW MEAT

Date: Oct. 4, 1995.

Applied by: Establecimiento Florentino Orquera S.A.

Sample: Treated raw meat with cereal.

Analysis: Total anaerobic microorganisms count and search for Salmonella spp.

Results:
Total anaerobic microorganisms: less than 10 UFC/ml.
Salmonella spp in 25 gr.: negative.

TEST 2
MICROBIOLOGICAL ANALYSIS OF A MEAT PRODUCT

Date: Jul. 3, 1995.

Applied by: Engineer Felipe Schlapbach. Alberdi St. 1456. Santa Fe Province.

Sample: Raw meat product in a plastic bag.

Analysis: Total aerobic mesophyll microorganisms count.

Results:
Total aerobic mesophyll microorganisms: 59,000 UFC/gr.

While preferred embodiments of the present invention have been illustrated and described, it will be obvious to those skilled in the art that various changes and modifications may be made therein without departing from the scope of the invention as defined in the appended claims.

I claim:

1. A preserving composition for preserving a meat product obtained from slaughtered animals, the product being preserved by inhibiting the growth of undesired microorganisms, while the organoleptic features of the product are retained, the composition comprising:
a quantity of alkyl ($C_1$–$C_4$) esters of p-hydroxybenzoic acid in an aqueous solution present in an amount effective to inhibit the growth of undesired microorganisms in a meat product, the aqueous solution further containing at least partially dextrinized flour as a film forming agent.

2. The composition of claim 1, wherein the aqueous solution further comprises a wetting agent selected from 1,2-propylene glycol and 1,2-butylene glycol.

3. The composition of claim 2, wherein a mixture is formed by the alkyl ($C_1$–$C_4$) esters, the mixture comprising even molar moieties of methyl ester and propyl ester of p-hydroxybenzoic acid.

4. The composition of claim 3, wherein dextrins are formed from the partially dextrinized flour and the flour is a cereal flour, the dextrins being obtained from hydrolysis of the cereal flour.

5. The composition of claim 4, wherein the aqueous solution contains between 0.1 and 0.3 wt % of alkyl esters of p-hydroxybenzoic acid, based on the total weight of meat product and aqueous solution.

6. The composition of claim 5, wherein the aqueous solution contains between 1 and 2 wt % of p-propylene glycol, based on the total weight of meat product and aqueous solution.

7. The composition of claim 5, wherein the aqueous solution contains between 1 and 2 wt % of p-butylene glycol, based on the total weight of meat product and aqueous solution.

8. The composition of claim 4, wherein the flour is wheat flour.

* * * * *